Nov. 22, 1955  B. F. PARR  2,724,322

TOASTING APPARATUS

Filed July 20, 1951  2 Sheets-Sheet 1

WITNESSES:
R.G. Ridge
V. W. Novak

INVENTOR
Bernard F. Parr
BY Roy N. Emsall
ATTORNEY

Nov. 22, 1955  B. F. PARR  2,724,322
TOASTING APPARATUS
Filed July 20, 1951
2 Sheets-Sheet 2

INVENTOR
Bernard F. Parr
BY
ATTORNEY

United States Patent Office 2,724,322
Patented Nov. 22, 1955

2,724,322

TOASTING APPARATUS

Bernard F. Parr, Mansfield, Ohio, assignor to Westinghouse Electric Corporation, East Pittsburgh, Pa., a corporation of Pennsylvania Application July 20, 1951, Serial No. 237,727

11 Claims. (Cl. 99—327)

My invention relates to toasting apparatus of the type wherein bread slices are inserted in an oven and are moved first into toasting position and then to a non-toasting position after a predetermined period of toasting. An object of the invention is to provide improved apparatus of this kind.

A further object of the invention is to provide improved means for timing the toasting periods and for moving the toasted material to a position wherein it may be removed from the oven of a toaster of the type set forth.

In practicing my invention, a toaster structure of the type having a bread carriage movable between an upper, non-toasting position and a lower toasting position is preferably employed. The carriage is moved from its toasting to its non-toasting position by a motor driven mechanism which is adjustable to vary the duration of the toasting periods and, therefore, the color of the toast produced. The motor driven mechanism includes a constant speed motor driving a gear train which has one shaft rotating at low speed and a second shaft rotating at a higher speed. The means for actuating the carriage may include a driven segmental gear connectible to the low and high speed shafts by respective clutches of the pawl and ratchet type. The low speed clutch connecting the slow speed shaft and segmental gear provides for over running of the segmental gear relative the slow speed shaft at times when the high speed clutch connects the high speed shaft and the segmental gear. The arrangement is such that the slow speed clutch drives the gear at slow speed throughout the major portion of the toasting period and the high speed clutch is automatically engaged to conclude the toasting period by rotation of the gear at high speed. A pinion may be employed for actuating the bread carriage, through a suitable mechanism, from its toasting position to its non-toasting and this pinion is meshed with and driven by the gear segment during this operation. During the toasting period the gear segment and pinion are out of mesh.

The segmental gear is rotated about its axis once for a complete toasting operation. During the toasting period, rotation of the gear through the low speed clutch is effected and the toasting period is concluded by engagement of the high speed clutch. The duration of the toasting period is varied by engaging the high speed clutch earlier or later during a revolution of the gear. Manually adjustable means is provided for this variation in the operation of the high speed clutch and means is provided for disengaging the high speed clutch at about the time the gear is meshed with the pinion for movement of the carriage to its non-toasting position. Suitable manually actuated means is provided for the engagement of the high speed clutch at any time so that the carriage may be elevated at will.

The foregoing and other objects are effected by my invention as will be apparent from the following description and claims taken in connection with the accompanying drawings, forming a part of this application, in which:

Figure 1:
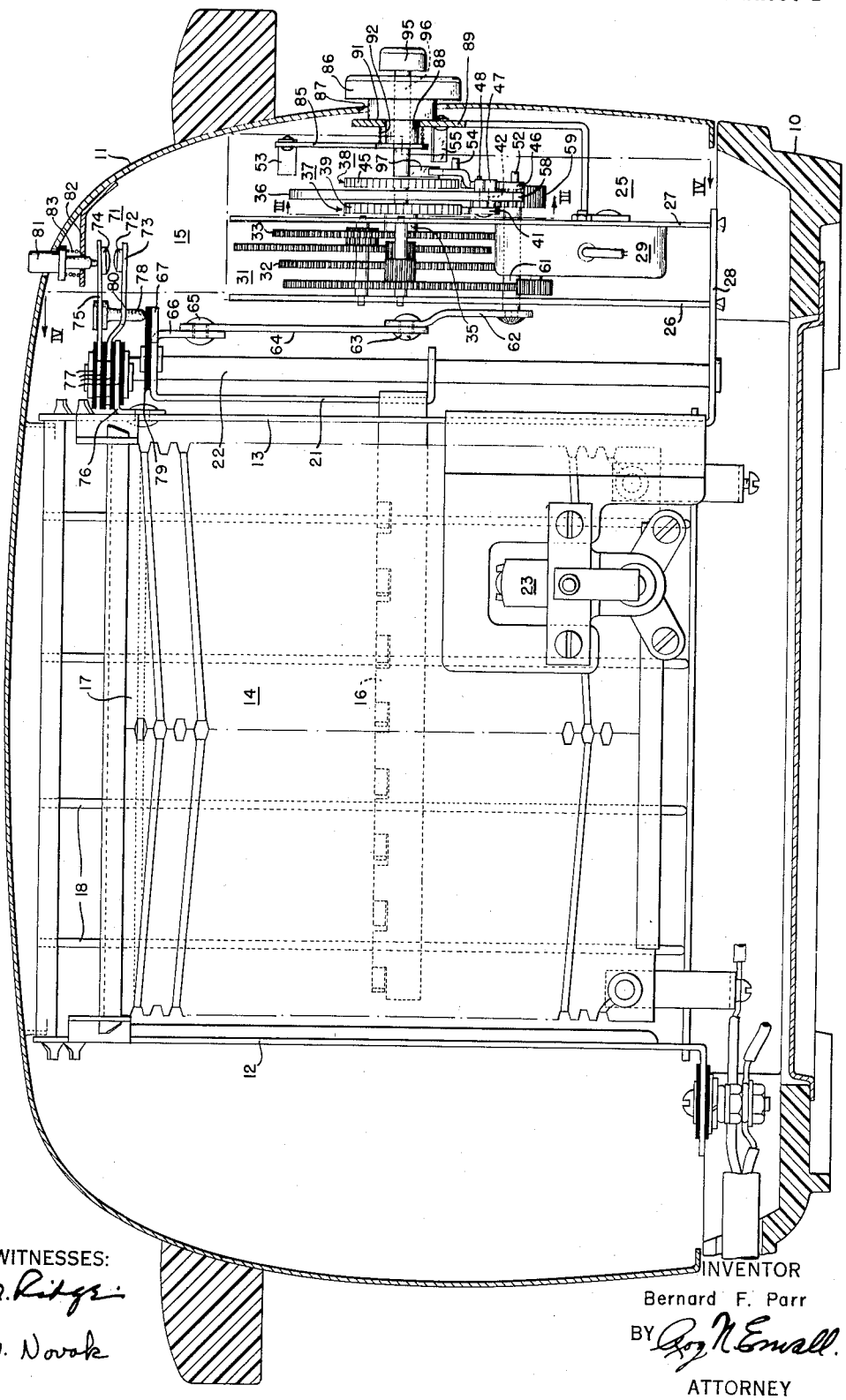
Fig. 1 is a longitudinal section taken through an oven type toaster constructed and arranged in accordance with the invention.

Reference will now be had to the drawings wherein I have elected to disclose my invention applied to a toaster of the type having a base structure 10 and a casing 11 suitably supported thereon. Arranged within the casing 11 are transversely extending partitions 12 and 13 which divide the interior of the casing into a toasting oven 14 and an apparatus compartment 15. A pair of slice bars 16 are disposed within the oven 14 in a position to receive slices of bread to be toasted and which are passed through suitable openings (not shown) formed in the upper side of the casing 11 in a well understood manner. Also arranged within the oven 14 is a plurality of heating elements 17 of any suitable construction for radiantly heating bread slices carried by the bars 16. Guard wires 18 which may be of conventional construction are disposed on opposite sides of the slice bars 16 for properly supporting the bread slices upon the bars 16.

The slice bars 16 extend through narrow slots 19 (Fig. 2) formed in the partition 13 and are secured to a carriage 21 disposed within the apparatus compartment 15. The carriage 21 is movable between an upper non-toasting position, as shown in Fig. 1, to a lower toasting position. To this end the carriage is slidably supported upon two vertical guide rods 22 which are secured within the apparatus compartment 15 in any suitable manner.

Figure 5:
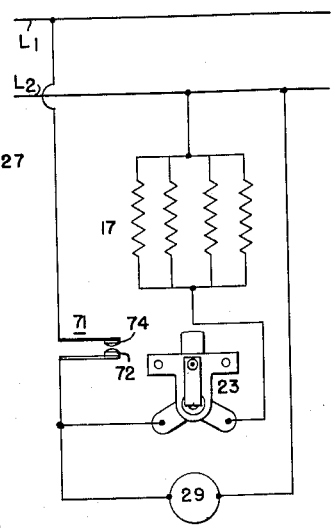
Fig. 5 is a diagram of the electrical connections.

Also arranged within the oven 14 is a thermostatically-operated switch structure generally indicated by the numeral 23 which is electrically connected in series with the heating elements 17, as shown in Fig. 5. The thermostatically-operated switch structure 23 is subjected directly to the radiant heat of the heating elements 17 and operates to energize and deenergize the heating elements in response to the temperature thereof during a toasting operation. Since the thermostatically-operated switch structure 23 forms no part of the present invention, it is not being shown in detail for the sake of brevity and clearness. A suitable thermostatically-operated switch of this type applied to a toaster is disclosed and claimed in the patent of E. K. Clark, No. 2,679,203, granted May 25, 1954 and assigned to the assignee of the present application.

Figure 2:
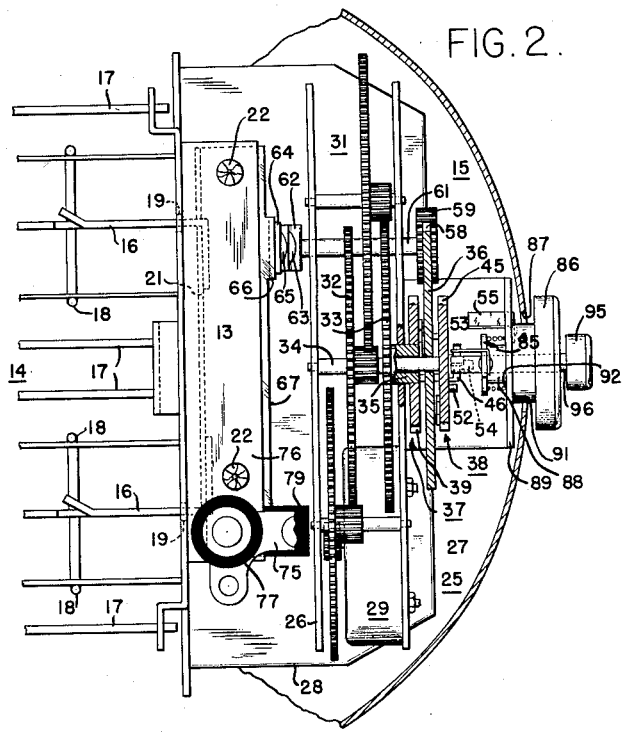
Fig. 2 is a plan view of one end of the toaster shown in Fig. 1 with the casing shown in section and parts broken away for clearance.

In accordance with my invention, a motor-driven mechanism generally indicated at 25 is disposed within the apparatus compartment 15 for the raising and lowering of the bread carriage 21 and for timing the duration of the toasting period. The mechanism 25 includes a pair of frames 26 and 27, secured in any suitable manner at their lower edges to a plate 28 which may be integral with the partition 13, as shown. A substantially constant speed motor 29 is supported by the frame 27 and serves to drive a gear train indicated at 31 and including an intermediate, relatively high speed gear 32 and a final, relatively low speed gear 33. The intermediate gear 32 is fixed to a shaft 34 which rotates at a speed of approximately 30 R. P. M. and the low speed gear 33 is fixed to a hollow shaft 35 which rotates at a relatively low speed of the order of one revolution in 2½ minutes. As shown in Fig. 2, the low speed shaft 35 is hollow and serves as a bearing in which the higher speed shaft 34 is journaled. The low speed shaft 35 is suitably journaled for rotation in the frame 27 and the higher speed shaft 34 is also journaled at one end in the frame 26.

For a purpose to be described hereinafter, a segmental gear 36 is journaled on the high speed shaft 34 for relative movement therewith. The segmental gear 36 is driven at low and high speeds by the low and high speed shafts 35 and 34, respectively, through pawl and ratchet type clutches indicated generally at 37 and 38.

Figure 3:
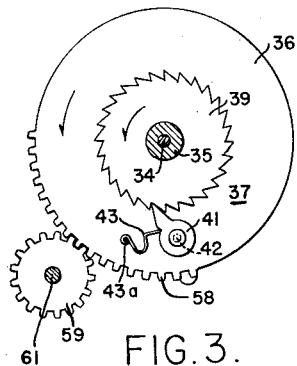
Fig. 3 is a section viewed from the plane III—III of Fig. 1 and showing the low speed clutching mechanism.

The low speed clutch 37, as best shown in Figs. 1 and 3, includes a rotary ratchet wheel 39 which is fixed to and driven by the low speed shaft 35. The ratchet wheel 39 serves to drive a pawl 41 which is movably carried by a pin 42, the latter being secured in any suitable manner to the gear segment 36. The pawl 41 is biased into engagement with the ratchet wheel 39 at all times by a compression spring 43, the latter being carried by a pin 43a fixed to the gear segment 36 (see Fig. 3). It will be noted that the low speed clutch 37 is of the overrunning type so that the gear segment 36 is either driven by the ratchet 39 through the pawl 41 at low speed or may be rotated at a higher speed, as described hereinafter, at which time the pawl 41 rides over the teeth of the ratchet 39. Rotation of the ratchet 39 and the gear segment 36 is in the direction indicated by the arrows in Fig. 3.

Figure 4:
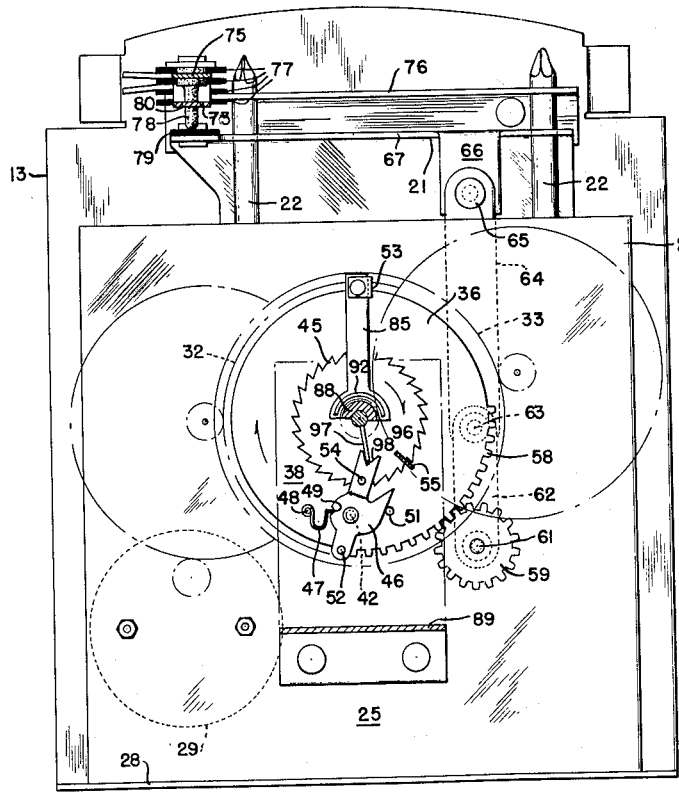
Fig. 4 is a section taken along the line IV—IV of Fig. 1.

The high speed clutch 38, as best shown in Fig. 4, includes a relatively high speed ratchet wheel 45 which is fixed to and driven by the high speed shaft 34 of the gear train 31. The high speed clutch 38 may be selectively engaged and disengaged and, to this end, the pawl 46 thereof is movable into and out of engagement with the ratchet 45. As best shown in Figs. 1 and 4, the pawl 46 is movably carried by an extension of the pin 42 and is biased either out of engagement with the ratchet 45 or into engagement therewith by a compression spring of the over-center type and indicated at 47. The spring 47 is fixed at one end to a pin 48 carried by the segmental gear 36 and the opposite end of the compression spring 47 is engaged in a notch 49 formed in the pawl. As shown in Fig. 4, the pawl is disengaged from the ratchet wheel 45 and engages a stop 51 which projects from and is fixed to the gear segment 36. Engagement of the high speed clutch 38 is effected by swinging the pawl 46 counterclockwise about its pivot pin 42, the spring 47 at this time passing over center and then functioning to maintain the pawl 46 in engagement with the ratchet wheel 45. Engagement of the pawl 46 and ratchet wheel 45 is effected by a projection 52 on the pawl 46 which projection is engageable with an adjustable stop 53 disposed in the circular path of movement of the pin 52. It will be understood that the ratchet wheel 45 and segment gear 36 rotate clockwise as viewed in Fig. 4.

Disengagement of the high speed clutch 38 is effected by the disengagement of the pawl 46 from the ratchet wheel 45. To carry out this operation, the pawl 46 is provided with a second projection 54 which is engageable with a fixed stop 55 during high speed rotation of the segment gear 36 and the pawl 46 carried thereby. When the projection 54 engages the stop 55, the pawl 46 is actuated to the position thereof shown in Fig. 4 in snap acting manner by the overcenter spring 48, whereupon slow speed rotation of the gear segment 36 is again initiated through the slow speed clutch 37. The stops 53 and 55 are preferably formed of spring material but are sufficiently stiff to actuate the pawl 46 in opposition to the bias of the overcenter spring 47. Being resilient, however, the stops 53 and 55 flex after actuation of the pawl to permit the projections 52 and 54 to pass.

The mechanism for raising and lowering the carriage structure 21 will now be described. As best shown in Figs. 3 and 4, the gear segment 36 is provided with an arcuate series of gear teeth 58 which are moved into and out of meshing relation with the teeth of a pinion 59 during a rotation of the segment gear 36, further reference to this operation being made hereinafter. The pinion 59 is fixed to a shaft 61 suitably journaled in the frames 26 and 27 and carrying a crank arm 62 at the inner end thereof. A crank pin 63 connects the crank arm 62 to a connecting rod 64, the upper end of which is connected through a swivel pin 65 to an ear 66, the latter projecting downwardly from a horizontal flange 67 forming a part of the carriage 21.

Control of energization of both the motor 29 and the heating element 17 is effected by a switch structure 71 best shown in Fig. 1. The switch structure 71 includes a fixed contact 72 carried by a conducting arm 73 and a movable contact 74 electrically connected to a resilient conducting arm 75. The switch structure 71 is supported by a horizontal flange 76 fixed in any suitable manner to the upper portion of the partition 13. As shown, the conducting arms 73 and 75 are supported by the flange 76 and are suitably insulated from each other by insulating washers 77. The resilient arm 75 biases the contact 74 toward the fixed contact 72 at all times. In the upper or inactive position of the carriage 21, the contacts 74 and 72 are separated by a finger 78 which is secured to the resilient arm 75 and which projects downwardly for engagement with the movable horizontal flange 67 of the carriage 21. Preferably, an insulating sheet 79 separates the finger 78 and the flange 67 as shown in Fig. 1. The finger 78 extends through an opening 80 formed in the contact support 73.

Operation of the toaster is initiated merely by closing the switch structure 71 and, for this purpose, an insulating push button 81 is provided. The push button 81 projects outwardly of the casing 11 through a suitable opening therein and is carried by a bracket 82 secured to the casing 11. A compression spring 83 biases the push button upwardly. When the push button 81 is depressed, the movable contact 74 is forced into engagement with the contact 72, the resilient arm 75 flexing at this time. When the carriage 21 has been moved downwardly, the button 81 may be released as the bias of the arm 75 maintains the contacts 72 and 74 in engagement. At the end of the toasting operation or when the carriage 21 has been moved to its upper position, as shown, the contacts 72 and 74 are maintained out of engagement by the finger 78.

*Operation*

In the operation of the toaster as described up to the present, the material to be toasted is disposed on the slice bars 16 and the push button 81 is depressed for closing the switch 71. As shown in Fig. 5, the heating elements 17 are thereby energized under control of the thermostat 23 and the motor 29 is energized solely under control of the switch 71. The source of power for the toaster is indicated by line conductors $L_1$ and $L_2$ which may constitute a conventional house circuit.

Energization of the motor 29 initiates operation of the gear train 31 and rotation of the high and low speed shafts 34 and 35, respectively. Since, at this time, the high speed clutch 38 is disengaged as shown in Fig. 4, rotation of the gear segment 36 is through the low speed clutch 37. The initial movement of the gear segment 36 rotates the pinion 59 sufficiently to move the crank arm 62 and connecting rod 64 from their dead center position, as shown in Fig. 4, whereupon the weight of the carriage 21 and the material being toasted moves the carriage by gravity to its lower toasting position. During this movement, the pinion 59 and crank arm 62 move counterclockwise, as viewed in Fig. 4, approximately 180 degrees. It will also be noted that this 180-degree movement of the pinion 59 will rotate the gear segment 36, the pawl 41 riding over the teeth of the ratchet 39 during this movement. Also, at the end of this 180-degree movement of the pinion 59, the teeth of the latter become disengaged from the teeth 58 of the gear segment 36.

At this time, toasting of the bread is carried out with the carriage 21 in its lower position. Energization of the heater 17 at this time is under control of the thermostat 23 as described in the aforementioned copending application of E. K. Clark.

During the toasting period, the gear segment 36 is rotated slowly through the low speed clutch 37 and out of mesh with the pinion 59. Toward the end of this period, the projection 52 will have been moved into engagement with the stop 53. Continued rotation of the gear segment 36 will move the pawl 46 in a snap-acting manner into engagement with the high speed ratchet 45 whereupon the gear segment 36 will rotate at relatively high speed, the low speed clutch 37 overrunning at this time. Just prior to the engagement of the teeth 58 and the pinion 59, the projection 54 of the pawl 46 will have engaged the fixed stop 55. Accordingly, the pawl 46 will be swung clockwise into engagement with the stop 51 and out of engagement with the high speed ratchet 45. Accordingly, the gear segment 36 is then driven at low speed through the clutch 37 and meshing of the teeth 58 with the pinion 59 is carried out at low speed.

Continued low speed rotation of the gear 36 rotates the pinion 59 180 degrees to the position shown in the drawing and, during this movement, the bread carriage 21 is elevated to its upper position. The switch 71 is opened, as described, when the finger 78 is moved upwardly by the insulating plate 79 on the carriage 21. Accordingly, both the heating element 17 and the motor 29 are deenergized. The bread carriage 21 is now maintained in its upper position by the crank arm 62 and connecting rod 64 which are substantially in alignment.

From the preceding description, it will be noted that the duration of the toasting period is determined by the time required for the gear segment 36 to rotate the projection 52 of pawl 46 into engagement with the stop 53 at low speed. Accordingly, the duration of the toasting period and, therefore, the color of toast produced may be varied by adjusting the stop 53 angularly about the axis of the segment 36 so that the high speed clutch 38 is engaged earlier or later during the rotation of the segment 36. By advancing the stop 53 counterclockwise, as viewed in Fig. 4, the period of slow speed operation of the segment 36 and the duration of the toasting period are reduced and relatively light colored toast is produced. Conversely, by moving the stop clockwise, the period of slow speed operation of the segment and the duration of the toasting period are increased for the production of darker toast. To provide for this adjustment, the stop 53 is carried by an arm 85 which is secured to a rotatable color control knob 86 arranged exteriorly of the casing 11. The knob 86 extends through an opening 87 in the casing 11 and includes a hub 88 which is journaled in a bracket 89 secured to the frame 27. The arm 85 is suitably secured to the end of the hub 88 for rotation thereby. The hub 88 has a shoulder 91 bearing against the bracket 89 and a compression spring 92 is employed for providing sufficient friction between the shoulder 91 and bracket 89 to prevent angular movement of the arm 85 when the stop 53 is engaged by the projection 52. The fixed stop 55 may be secured to the bracket 89 in any suitable manner.

In order to raise the carriage 21 at the will of the operator, a handle 95 is provided. The latter is carried by stem 96 which is journalled for rotary movement in a suitable opening in the knob 86. The inner end of the stem 96 carries a radial tongue 97 that fits within a notch 98 in the pawl 46 (see Fig. 4). During rotation of the pawl 46 about the axis of the gear segment 36 as described, the tongue 97, being disposed in the notch 98, is carried around by the pawl 46. By manually turning the handle 95 and stem 96 clockwise as viewed in Fig. 4, the pawl 46 is swung about its pin 42 into engagement with the ratchet 45 for initiating high speed operation of the gear segment and the subsequent raising of the carriage 21 in the same manner as described. Of course, the fixed stop 55 will always disengage the pawl 46 and ratchet 45 regardless of whether the engagement of these members is automatically or manually effected.

From the foregoing description, it will be apparent that I have provided improved means for timing the duration of a toasting period and for the actuation of the slice carriage in a toaster of the type set forth. While I have disclosed the invention applied to a mechanism for both lowering and raising the carriage, it will be understood that it may be applied equally well to mechanisms for elevating the carriage only, the lowering of the carriage being manually effected. The novel mechanism disclosed herein accurately times the periods of toasting and may be readily adjusted for varying the duration of such periods.

While I have shown my invention in but one form, it will be obvious to those skilled in the art that it is not so limited, but is susceptible of various changes and modifications without departing from the spirit thereof.

What I claim is:

1. In a toaster, the combination of a bread carriage, means supporting the carriage for movement between an inactive position and a toasting position, means for moving the carriage from its toasting position to its inactive position, timing means for controlling the period of time that the carriage is retained in toasting position and including motor-driven means, a pair of rotary elements respectively driven at low and high speeds by the motor-driven means, a rotary member alternately driven by said rotary elements, an over running clutch mechanism connecting the low speed element and said rotary member for driving the latter at low speed through a first range of movement, an adjustable clutch mechanism for engaging and disengaging the high speed element and the rotary member, said adjustable clutch mechanism when engaged driving the rotary member at high speed through a second range of movement, and means actuated by the rotary member toward the conclusion of said second range of movement thereof for effecting operation of said carriage moving means.

2. The combination as claimed in claim 1 including manually adjustable means for engaging said adjustable clutch in different positions of said rotary member, whereby the period of time that the rotary member is driven at low speed and the duration of the toasting operation are varied.

3. In a toaster, the combination of a bread carriage, means supporting the carriage for movement between an inactive position and a toasting position, means for moving the carriage from its toasting position to its inactive position, timing means for controlling the period of time that the carriage is retained in toasting position and including motor-driven means, a pair of rotary elements respectively driven at low and high speeds by the motor-driven means, a rotary member alternately driven by said rotary elements, an overrunning clutch mechanism connecting the low speed element and said rotary member for driving the latter at low speed through a first range of movement, an adjustable clutch mechanism for engaging and disengaging the high speed element and the rotary member, said adjustable clutch mechanism when engaged driving the rotary member at high speed through a second range of movement, manually adjustable means for engaging the adjustable clutch mechanism in different positions of the rotary member for varying the period of time that the rotary member is driven at low speed through the first range of movement, means for disengaging the adjustable clutch mechanism in a predetermined position of the rotary member for terminating the second range of movement thereof and means actuated by the rotary member toward the conclusion of said second range of movement for effecting operation of the carriage moving means.

4. The combination as claimed in claim 3 including means manually operated at will for engaging the adjustable clutch mechanism independently of said manually adjustable means.

5. In a toaster, the combination of a bread carriage, means supporting the carriage for movement between an inactive position and a toasting position, means for actuating the carriage from its toasting position to its inactive position and including a member rotatable at relatively high and low speeds, motor-driven means, a pair of rotary elements respectively driven at relatively low and high speeds by said motor-driven means, an overrunning clutch mechanism connecting said low speed element and the rotatable member, an adjustable clutch connecting said high speed element and the rotatable member, means adjustable to various stations for engaging the adjustable clutch in different positions of the rotatable member and means for disengaging the adjustable clutch in a predetermined position of the rotatable member.

6. The combination as claimed in claim 5 including means manually actuated at will for engaging the adjustable clutch regardless of the station in which said adjustable means is positioned.

7. In a toaster, the combination of a bread carriage movable between an upper non-toasting position and a lower, toasting position, means for actuating the carriage from the toasting to the non-toasting position thereof, means including a member rotatable about an axis for effecting operation of the carriage actuating means at the conclusion of a range of movement of the member, a motor, relatively low and high speed ratchet wheels driven by the motor, a pawl carried by said member and biased into engagement with said low speed ratchet wheel, a second pawl carried by said member and movable into and out of engagement with the high speed ratchet wheel, an adjustable device manually movable to a plurality of selective positions for moving said second pawl into engagement with the high speed ratchet wheel, and a fixed member engageable with the second pawl for disengaging the latter from the high speed ratchet wheel.

8. In a toaster, the combination of a bread carriage, means supporting the carriage for movement between an upper position and a lower, toasting position, means for actuating the carriage from its toasting position to said upper position and including a pinion, an arm rotatable with said pinion, a connecting rod pivoted to said arm and carriage, a gear segment rotatable into and out of meshing relationship with said pinion, a pair of ratchet wheels rotatable at relatively high and low speeds, motor-driven means for driving the ratchet wheels, a pawl structure driven by the low speed ratchet wheel for rotating the gear segment and permitting overrunning movement of the gear segment relative the low speed ratchet wheel, a second pawl intermediate the gear segment and the high speed ratchet wheel and movable into and out of engagement with the latter, manually adjustable means for engaging the second pawl and the high speed ratchet wheel in various positions of the gear segment, means for disengaging the second pawl and the high speed ratchet wheel in a predetermined position of the gear segment, means for energizing said motor-driven means to initiate a toasting operation and means for deenergizing the motor-driven means at the conclusion of a toasting operation.

9. The combination as claimed in claim 8 including manually actuated means for engaging the second pawl and high speed ratchet wheel at will.

10. In a toaster, the combination of a bread carriage, means supporting the carriage for movement between a non-toasting position and a toasting position, a substantially constant speed motor, a transmission driven by the motor and having relatively high and low speed elements, means including a member movable through a constant range of movement for actuating the carriage from its non-toasting to its toasting position and thence to its non-toasting position, a clutching mechanism alternately connecting the member to said low and high speed elements for actuation thereby through its range of movement and means manually operated at will for adjusting said clutching mechanism and determining the ratio of the period of time that the low speed element drives said member and the period of time that the high speed element drives the member.

11. The combination as claimed in claim 10 including a second manually actuated means for adjusting the clutching mechanism to connect the high speed element and said member independently of the adjustment of the first-named manually operated adjusting means.

References Cited in the file of this patent

UNITED STATES PATENTS

| | | |
|---|---|---|
| 2,165,204 | Anderson | July 11, 1939 |
| 2,207,946 | Sardeson | July 16, 1940 |
| 2,236,406 | Ireland | Mar. 25, 1941 |
| 2,347,385 | Wright et al. | Apr. 25, 1944 |
| 2,378,073 | Felver et al. | June 12, 1945 |
| 2,470,003 | Thomas | May 10, 1949 |
| 2,532,569 | Poole et al. | Dec. 5, 1950 |
| 2,553,593 | Lermont | May 22, 1951 |
| 2,582,760 | Schoonmaker | Jan. 15, 1952 |